United States Patent
Israelsson et al.

(10) Patent No.: US 6,542,605 B1
(45) Date of Patent: Apr. 1, 2003

(54) METHOD AND ARRANGEMENT FOR CHOOSING SUPPLY VOLTAGE

(75) Inventors: Mattias Israelsson, Stockholm (SE); Anders Emericks, Solna (SE); Carl-Henrik Malmgren, Stockholm (SE); Henrik Hellberg, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/323,604

(22) Filed: Jun. 1, 1999

(30) Foreign Application Priority Data

Jun. 2, 1998 (SE) ................................................ 9801950

(51) Int. Cl.$^7$ .......................... H04M 1/00; H04M 9/00; H04M 9/08
(52) U.S. Cl. .................. 379/413; 379/399.01; 379/403; 379/404
(58) Field of Search .................. 379/399.01, 401, 379/402, 403, 404, 413, 443.01, 413.02

(56) References Cited

U.S. PATENT DOCUMENTS 5,754,644 A  5/1998  Akhteruzzaman 6,233,335 B1 * 5/2001 Ludeman

FOREIGN PATENT DOCUMENTS

| DE | 41 39 608 | 6/1993 |
| EP | 0 269 579 | 6/1987 |
| WO | 96/15617 | 5/1996 |
| WO | 97/06630 | 2/1997 |

\* cited by examiner

Primary Examiner—Duc Nguyen
(74) Attorney, Agent, or Firm—Burns, Doane, Swecker & Mathis, L.L.P.

(57) ABSTRACT

Line circuits can be supplied with a first voltage or a second voltage of a lower absolute value. At least the second voltage is variable. The line voltages of at least active line circuits are measured, and possible values for the second voltage are prognosticated. It is determined which line circuits can be supplied with the respective possible value, and the power consumption of those line circuits is calculated using each possible value. For the line circuits which cannot be so supplied, the power consumption is calculated using the first voltage. For each possible value prognosticated for the second voltage, the total power consumptions are summed, and the value that gives the lowest total power consumption is selected as the second voltage. The line circuits are then supplied with the first voltage or the selected second voltage.

2 Claims, 1 Drawing Sheet

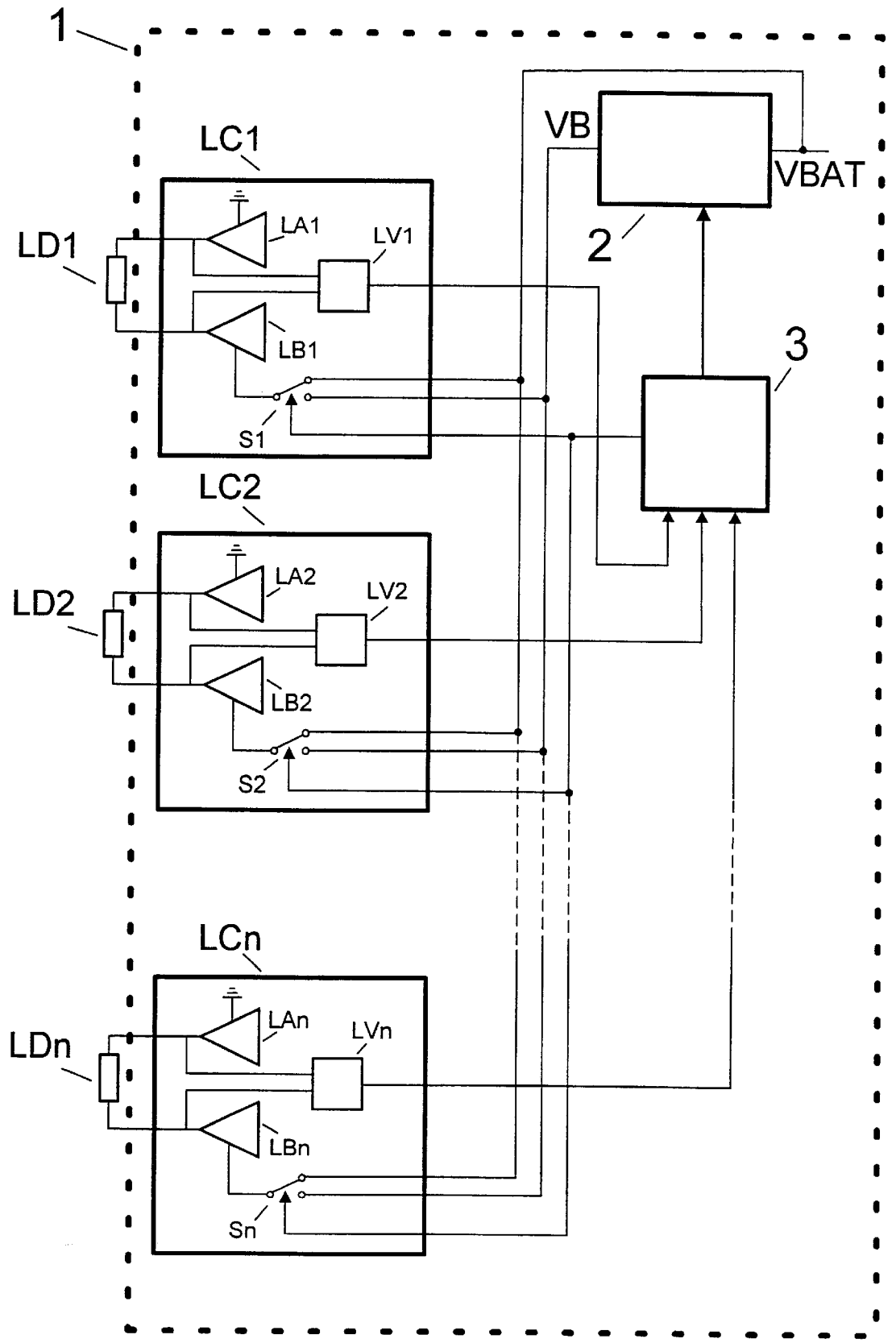

METHOD AND ARRANGEMENT FOR CHOOSING SUPPLY VOLTAGE

This application claims priority under 35 U.S.C. §119 and/or 365 to 9801950-8 filed in Sweden on Jun. 2, 1998; the entire content of which is hereby incorporated by reference.

TECHNICAL FIELD

The invention relates generally to line interface boards and more specifically to minimizing the power consumption of line circuits on a line interface board.

BACKGROUND

In a subscriber line interface circuit driving a two-wire line, the line voltage as well as the line current is a function of the line load, i.e. the resistance of the telephone set and the line itself When the line is open, the line is supplied with a maximum voltage at the same time as the current is zero. In order for the line circuit to operate, it must have access to a supply voltage which is somewhat higher than the required line voltage.

When the line is closed, i.e. when the line is loaded, the line voltage will decrease while the line current will increase depending on the sum of the line resistance and the load resistance.

The difference between the supply voltage and the line voltage will be applied across the line circuit through which the line current flows. This causes power consumption in the line circuit.

The power consumption in the line circuit will be highest for short lines, i.e. for a low total value of the resistances of the line and the load.

In many cases. the power consumption or power loss is accepted in the line circuit.

In some cases, a DC/DC converter can be used for each line to keep the maximum power consumption low. The output voltage from the respective converter is continuously controlled in order to be adapted to the instant line load. However, the use of such converters causes disturbing radiation and increased complexity of the circuits.

From WO 96/15617, it is known to use a number of analog series regulators corresponding to the number of driving voltages to minimize the power consumption by switching the supply voltage to the supply voltage having an absolute value which for the moment is the lowest adequate supply voltage.

When using line circuits with the above switching arrangement with e.g. two supply voltages, the voltage having the lower absolute value is set to a fixed predetermined value for which the least power consumption is expected. This predetermined value is usually set for all line interface boards. The voltage having the higher absolute value, is usually the battery voltage.

SUMMARY

The object of the invention is to further minimize the power consumption of line circuits on line interface boards.

This is generally attained in accordance with the invention by adaptively adapting the supply voltage in response to the actual line voltages.

Hereby, it will be possible to further reduce the power consumption in line circuits on line interface boards.

BRIEF DESCRIPTION OF THE DRAWING

The invention will be described more in detail below with reference to the appended drawing on which the single FIGURE shows an embodiment of an arrangement according to the invention.

DETAILED DESCRIPTION

The FIGURE shows a line interface board 1 having a number of line circuits LC1, LC2 . . . LCn where n can be equal to e.g. 16.

In a manner known per se, two-wire lines are connected to the line circuits LC1, LC2 . . . LCn, and in the embodiment shown, the lines are supposed to be terminated by respective impedances LD1, LD2 . . . LDn.

In the respective line circuit, the respective wire of the lines is driven by amplifiers LA1, LA2 . . . LAn and LB1, LB2 . . . LBn, respectively.

In accordance with the invention, these amplifiers are supplied in such a manner that the total power consumption of the line circuits LC1, LC2 . . . LCn on the line interface board 1, is kept as low as possible.

In the embodiment shown, the line circuits LC1, LC2 . . . LCn are supposed to be supplied either with a fixed battery voltage VBAT or a variable voltage VB of a lower absolute value than VBAT.

In this connection, it should be pointed out that also VBAT may be variable.

In the illustrated embodiment of the invention, a switch S1, S2 . . . Sn is provided in each line circuit LC1, LC2 . . . LCn to switch the supply voltage between VBAT and VB. These switches may of course equally well be located external to the line circuits.

A controllable DC/DC converter 2 is provided on the line interface board 1 to generate VB from VBAT under control of signals from a processor 3.

The processor 3 is adapted to control the switches S1, S2 . . . Sn as will be described below.

In the illustrated embodiment of the invention, each line circuit LC1, LC2 . . . LCn is provided with a circuit LV1, LV2 . . . LVn for measuring the line voltage of the respective line circuit LC1, LC2 . . . LCn. The line voltage measured by the respective circuit LV1, LV2 . . . LVn is provided as input signals to the processor 3. It is to be understood that the circuits for measuring the line voltage equally well may be located external to the line circuits.

On the basis of measured line voltages, the processor 3 is adapted to prognosticate a number of possible values for the supply voltage VB. Also, the processor 3 is adapted to determine, from the measured line voltages as obtained from the circuits LV1, LV2 . . . LVn, whether or not the respective line circuit LC1, LC2 . . . LCn can be supplied with the respective possible value prognosticated for the supply voltage VB.

For the line circuits which can be supplied with the possible values prognosticated for the supply voltage VB, the processor 3 is adapted to calculate the power consumption of those line circuits for each of the possible values of VB.

For the line circuits which can not be supplied with the possible values prognosticated for the supply voltage VB. the processor 3 is adapted to calculate the power consumption of those line circuits using the fixed battery voltage VBAT.

For each of the possible values for the supply voltage VB, the processor 3 is adapted to sum the calculated power consumptions of the line circuits on the line interface board 1.

Preferably, only the power consumptions of active line circuits are calculated and summed.

To select the value of the supply voltage VB to be used, the processor 3 is adapted to select that value that gives the lowest total power consumption of the active line circuits on the line interface board 1.

To bring the line circuits on the line interface board 1 to choose as supply voltage either the battery voltage VBAT or the selected value of the supply voltage VB, as generated by the converter 2 in response to an input signal from the processor 3, the processor 3 is adapted to control the switches S1, S2 . . . Sn to the position where either VBAT or the selected value of VB is supplied to the respective line circuit.

A practical example will be described below.

Suppose that on the line interface board 1, there are three active line circuits having line voltages 13, 40 and 23 V, respectively. The line current is constant and supposed to be 0.027 A.|VBAT|=48 V.

In order for a line circuit to be supplied by VB. it is supposed that VB≧measured line voltage +6 V.

VB is Fixed to 28 V

Before the line interface board has been installed, the line voltages for all line interface boards has been investigated. It is supposed that the optimal value of VB has been found to be 28 V. Consequently, VB is set to 28 V on all line interface boards.

One of the active line circuits can be supplied with VB=28 V, while the other two line circuits must be supplied with VBAT=48 V.

Thus, the power consumption in the three active line circuits will be equal to $$(28-13) \times 0.027 + (48-40) \times 0.027 + (48-23) \times 0.027 = 1.296 \text{ W}.$$

VB is Adaptive

Three possible values for VB is prognosticated by adding 6V to the measured line voltages, i.e. 13, 40, and 23 V, respectively.

Thus, VB is prognosticated to the three following possible values:

$$VB1 = 19 \text{ V} \geq 13+6 \text{ V}$$

$$VB2 = 29 \text{ V} \geq 23+6 \text{ V} \geq 13+6 \text{ V}$$

$$VB3 = 46 \text{ V} \geq 40+6 \text{ V} \geq 23+6 \text{ V} \geq 13+6 \text{ V}.$$

For VB1=19 V, only one line circuit can be supplied with this supply voltage, while the other two line circuits have to be supplied with VBAT=48 V.

Thus, the power consumption will be equal to (19−13)×0.0027+(48−40)×0.027+(48−23)×0.027=1.053 W on the line interface board.

For VB2=29 V, two of the line circuits can be supplied with this supply voltage, while the third line circuit have to be supplied with VBAT=48 V.

Thus, the power consumption on the line interface board will be equal to (29−13)×0.027+(48−40)×0.027+(29−23)×0.027=0.81 W.

For VB3=46 V, all three active line circuits can be supplied with that supply voltage.

In this case the power consumption of the three active line circuits will be equal to (46−13)×0.027+(46−40)×0.027+(46−23)×0.027=1.674 W.

As apparent from the above, both VB1=19 V and VB2=29 V result in a lower power consumption in comparison with having VB constantly fixed to 28 V.

Since VB2=29 V gives the lowest power consumption, in this example, the processor 3 is adapted to select that voltage as the voltage VB to be generated by the converter 2.

Then, the processor 3 controls the switches S1, S2 . . . Sn to the position where either VBAT or VB is supplied to the respective line circuit LC1, LC2 . . . LCn.

What is claimed is:

1. A method of choosing whether line circuits on a line interface board are to be supplied with a first supply voltage or a second supply voltage of a lower absolute value than the first supply voltage, at least the second supply voltage being variable, comprising the steps of:

a) measuring line voltages of at least active line circuits on the line interface board, b) prognosticating a number of possible values for the second supply voltage, c) from the measured line voltages, determining whether or not the respective line circuit can be supplied with the respective possible value prognosticated for the second supply voltage, d) for the line circuits which can, calculating the power consumption of those line circuits using each of the possible values prognosticated for the second supply voltage, e) for the line circuits which cannot, calculating the power consumption of those line circuits using the first supply voltage, f) for each of the possible values prognosticated for the second supply voltage, summing the power consumption calculated in steps d) and e), g) selecting as the second supply voltage that value of the possible values that gives the lowest total power consumption of the line circuits on the line interface board, and h) choosing as the supply voltage, the first supply voltage or the second supply voltage as selected in step g).

2. An arrangement for choosing whether line circuits on a line interface board are to be supplied with a first supply voltage or a second supply voltage of a lower absolute value than the first supply voltage, at least the second supply voltage being variable, comprising:

means adapted to measure line voltages of at least active line circuits on the line interface board, means adapted to prognosticate a number of possible values for the second supply voltage, means adapted to determine, from the measured line voltages, whether or not the respective line circuit can be supplied with the respective possible value prognosticated for the second supply voltage, means adapted to calculate, for the line circuits which can, the power consumption of those line circuits using each of the possible values prognosticated for the second supply voltage, means adapted to calculate, for the line circuits which cannot, the power consumption of those line circuits using the first supply voltage, means adapted to sum, for each of the possible values prognosticated for the second supply voltage, the total power consumption of the line circuits on the line interface board from the calculations of the power consumption of the respective line circuit using each of the possible values prognosticated for the second supply voltage and the first supply voltage, respectively, means adapted to select as the second supply voltage that value of the possible values that gives the lowest total power consumption of the line circuits on the line interface board, and means adapted to choose as the supply voltage, the first supply voltage or the second supply voltage as selected.

* * * * *